United States Patent [19]

Ruben et al.

[11] Patent Number: 5,331,360
[45] Date of Patent: Jul. 19, 1994

[54] ADAPTOR FOR OVERHEAD PROJECTOR

[75] Inventors: Paul L. Ruben, Penfield; Edward J. Walsh, Pittsford, both of N.Y.

[73] Assignee: Eastman Kodak Company, Rochester, N.Y.

[21] Appl. No.: 34,970

[22] Filed: Mar. 22, 1993

[51] Int. Cl.[5] .......................................... G03B 21/54
[52] U.S. Cl. ................... 353/96; 353/DIG. 5; 353/122
[58] Field of Search ............... 353/95, 96, 97, DIG. 5, 353/DIG. 3, 23, 24, 25, 27 R, 122, 38, 88, 119, 104

[56] References Cited

U.S. PATENT DOCUMENTS

| | | | |
|---|---|---|---|
| 3,675,998 | 7/1972 | Wilton | 353/101 |
| 4,063,810 | 12/1977 | Mailloux | 355/4 |
| 4,120,580 | 10/1978 | Mailloux et al. | 355/14 |
| 4,188,101 | 2/1980 | Masuda | 353/95 |
| 4,353,627 | 10/1982 | Maemori | 353/96 |
| 4,989,330 | 2/1991 | Ozeki | 353/DIG. 5 |
| 5,013,148 | 5/1991 | Ozeki | 353/DIG. 3 |
| 5,092,672 | 3/1992 | Vanderwerf | 353/38 |
| 5,121,984 | 6/1992 | Jones et al. | 353/DIG. 3 |
| 5,168,294 | 12/1992 | Davis et al. | 353/97 |
| 5,223,870 | 6/1993 | Ozeki | 353/DIG. 3 |

Primary Examiner—William A. Cuchlinski, Jr.
Assistant Examiner—William C. Dowling
Attorney, Agent, or Firm—Peter J. Bilinski

[57] ABSTRACT

Apparatus for converting an overhead projector to use photographic slides includes a fresnel disk that shortens the illumination convergence point to match the focal length of a typical slide projector. The apparatus includes a base that covers the platen of the overhead projector to prevent illumination spillover, and supports projection optics over an aperture that admits illumination for projecting magnified images of slides onto a vertical viewing surface.

11 Claims, 3 Drawing Sheets

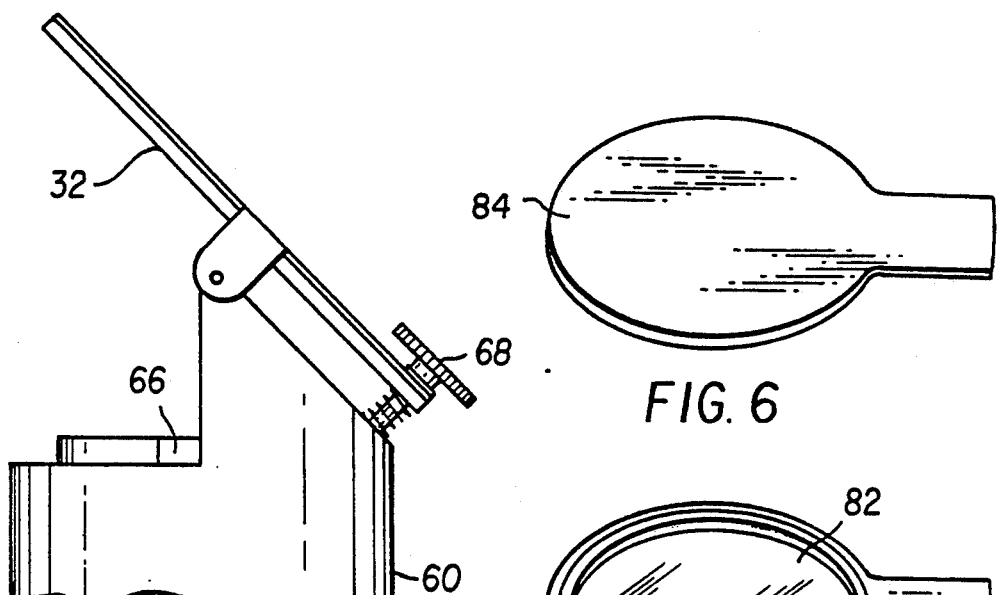
FIG. 3
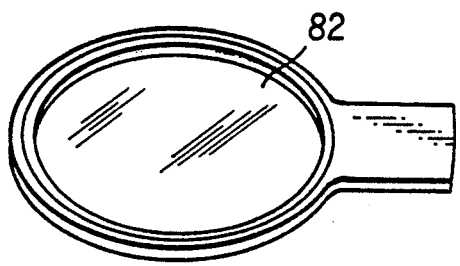
FIG. 6
FIG. 7
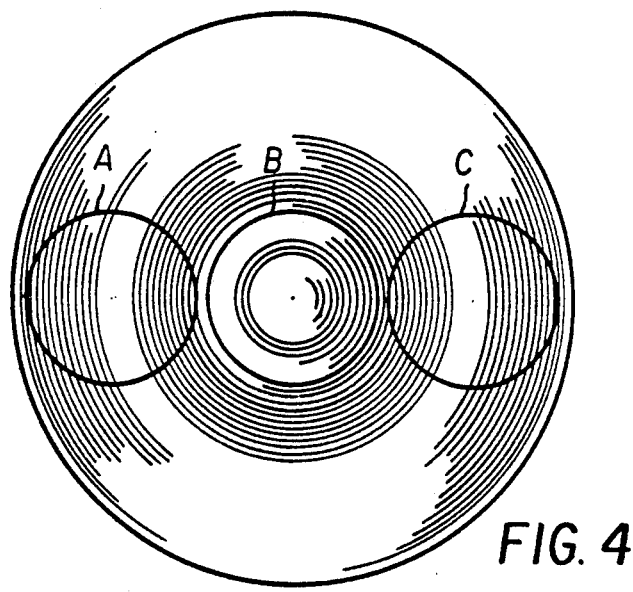
FIG. 4
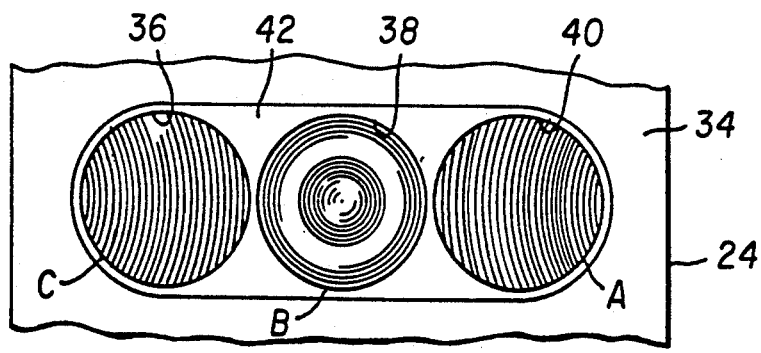
FIG. 5

ADAPTOR FOR OVERHEAD PROJECTOR

FIELD OF THE INVENTION

The invention relates to the field of image projectors and more specifically to an adaptor using the light source of an overhead projector for displaying images from small originals such as 35 mm slides.

BACKGROUND OF THE INVENTION

Overhead projectors are in common use for enlarging images from transparencies while projecting the images onto a viewing surface. Typically, such transparencies are approximately 21.6 by 28 centimeters and the projectors include a platen somewhat larger in size for supporting the transparencies over a light source. A fresnel lens condenses illumination from the source and directs it through the platen and transparency to converge 25 to 30 centimeters above the center of the platen. Optics of similar focal length are located there for enlarging the image and redirecting it horizontally toward a viewing surface. The degree of enlargement depends on the focal length of the optics and the image distance between the optics and the viewing surface.

Photographic slides are another popular medium for recording presentation material. Such slides are much smaller than the transparencies described above, having an image area approximately 43 millimeters on the diagonal, and traditionally are used in a projector having a more concentrated light source and smaller diameter optics of shorter focal length. A 12 to 16 centimeters focal length, for example, provides greater enlargement than a typical overhead projector at the same image distance.

PROBLEM TO BE SOLVED BY THE INVENTION

Although slides offer many advantages for presentation materials, particularly when they are color photographs, slides have not been suitable for use with overhead projectors. Illumination spills into the viewing room through the relatively large platen, around the small slide, and the longer focal length of an overhead projector does not provide sufficient magnification, resulting in a small, dark image. Since slide projectors often are not available in the office environment, presenters using slides frequently must bring their own projector.

SUMMARY OF THE INVENTION

The present invention is directed to overcoming one or more of the problems set forth above. Briefly summarized, according to one aspect of the invention, apparatus is provided for temporarily converting an overhead projector to use photographic slides. The overhead projector includes a platen and a fresnel lens for focusing illumination from a light source to converge at a first distance above the platen. In accordance with the present invention, the converting apparatus covers the platen, to prevent illumination spillover, but includes a relatively small aperture suitable in size for projecting slides. A fresnel disk, similar in power to the fresnel lens in the overhead projector, extends across the aperture and shortens convergence of the illumination to a second distance above the platen substantially half the first distance. A photographic slide is positioned in the illumination admitted by the aperture, and a projection lens having a focal length substantially equal to the second distance is positioned over the slide for projecting magnified images of the slide onto a vertical viewing surface.

In accordance with one feature of the invention, the apparatus is suitable for projecting three slides simultaneously. The base defines three similar apertures arranged in-line, one at the center and two on opposite sides of the center. Each aperture includes a fresnel disk defining a plurality of arcuate, concentric lenslets. The lenslets of the apertures on opposite sides of the middle are convex toward the middle for redirecting the illumination to converge above the aperture.

In accordance with another aspect of the invention, in combination with the above features, the conversion lens is arranged vertically over the platen and an adjustable mirror is disposed at an angle to optical path for redirecting the image onto a horizontal viewing surface.

These and other features and advantages of the invention will be more clearly understood and appreciated from a review of the following detailed description of the preferred embodiments and appended claims, and by reference to the accompanying drawings.

BRIEF DESCRIPTION OF THE DRAWINGS

FIG. 3 is a partial side elevation of the apparatus of FIGS. 1 and 2 depicting a mirror and its adjustment in accordance with one feature of the invention.

FIGS. 4 and 5 are top views showing a fresnel lens from a typical overhead projector (FIG. 4) and how it is cut into fresnel disks for positioning (FIG. 5) and use in accordance with the present invention.

FIG. 6 is a light-blocking paddle for use with the apparatus of the invention.

FIG. 7 is a color-filter paddle for use with the apparatus of the invention.

DESCRIPTION OF THE PREFERRED EMBODIMENTS

Figure 1:
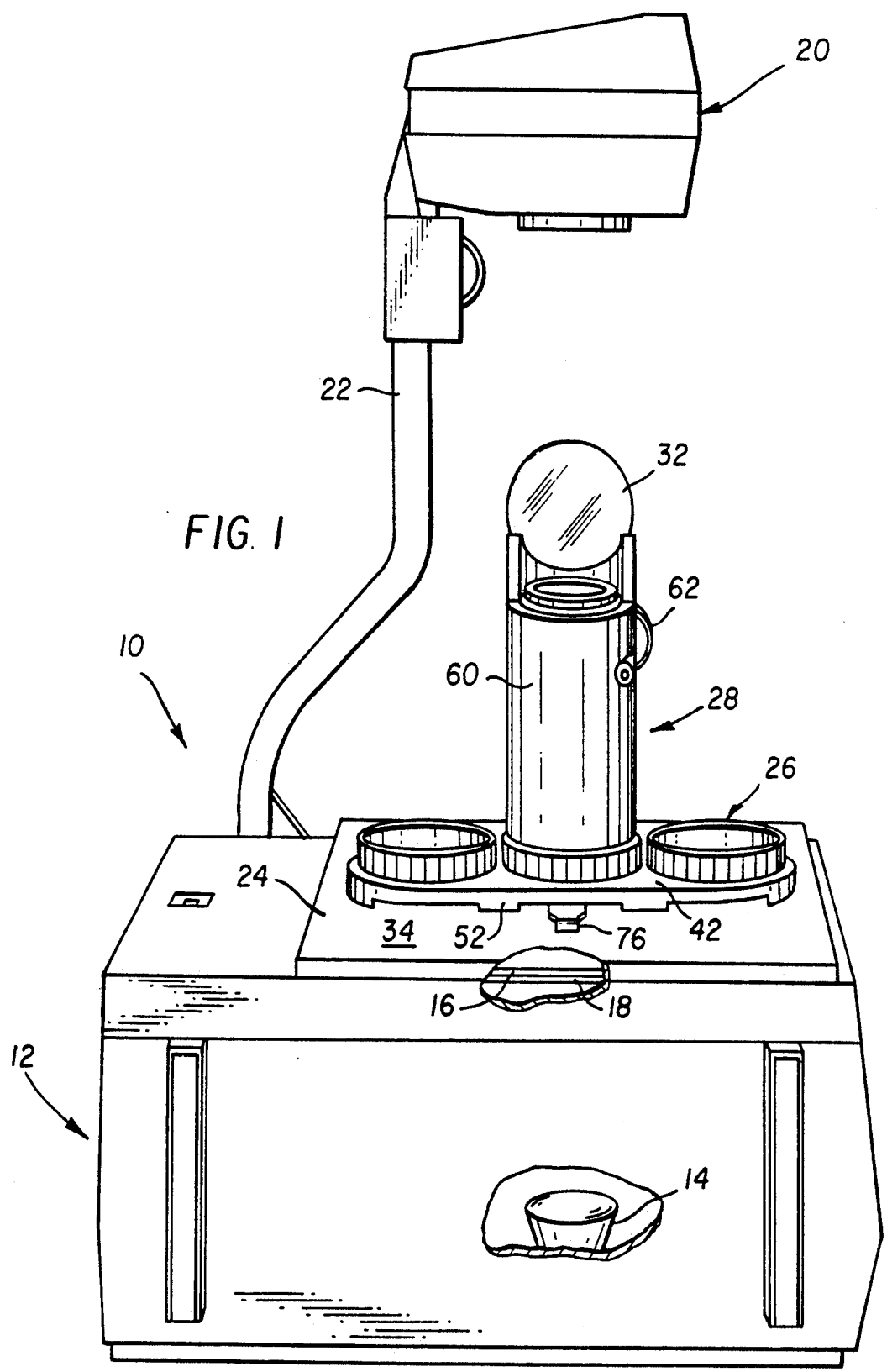
FIG. 1 is a perspective view of an overhead projector, and apparatus in accordance with the invention for converting the projector to use small presentation materials such as photographic slides.

The invention is intended for use with an overhead projector of the type shown sideways at 10 in FIG. 1. The projector includes a base 12, containing a light source 14, a platen 16, a fresnel condensing lens 18, adjacent the platen, and optics 20 suspended by arm 22 above the base. When used as an overhead projector, a transparency, typically 21.6 centimeters by 28 centimeters, is placed flat on the platen, which also is transparent and is large enough to support the entire underside of the transparency. Light from the source 14 is directed through the fresnel lens 18, which condenses and focuses the illumination to converge approximately 25 or 30 centimeters above the platen 16, after first passing through the platen and any transparency supported thereon. At that point, 25 to 30 centimeters centrally above the platen, optics 20 are suspended for enlarging the image and directing it horizontally (to the right in FIG. 1) for projection onto a suitable vertical surface.

In accordance with the present invention, apparatus is provided for converting an overhead projector, such as the projector 10 briefly descried above, for use with smaller presentation materials, preferably photographic slides having an image area approximately 43 millimeter on the diagonal.

Figure 2:
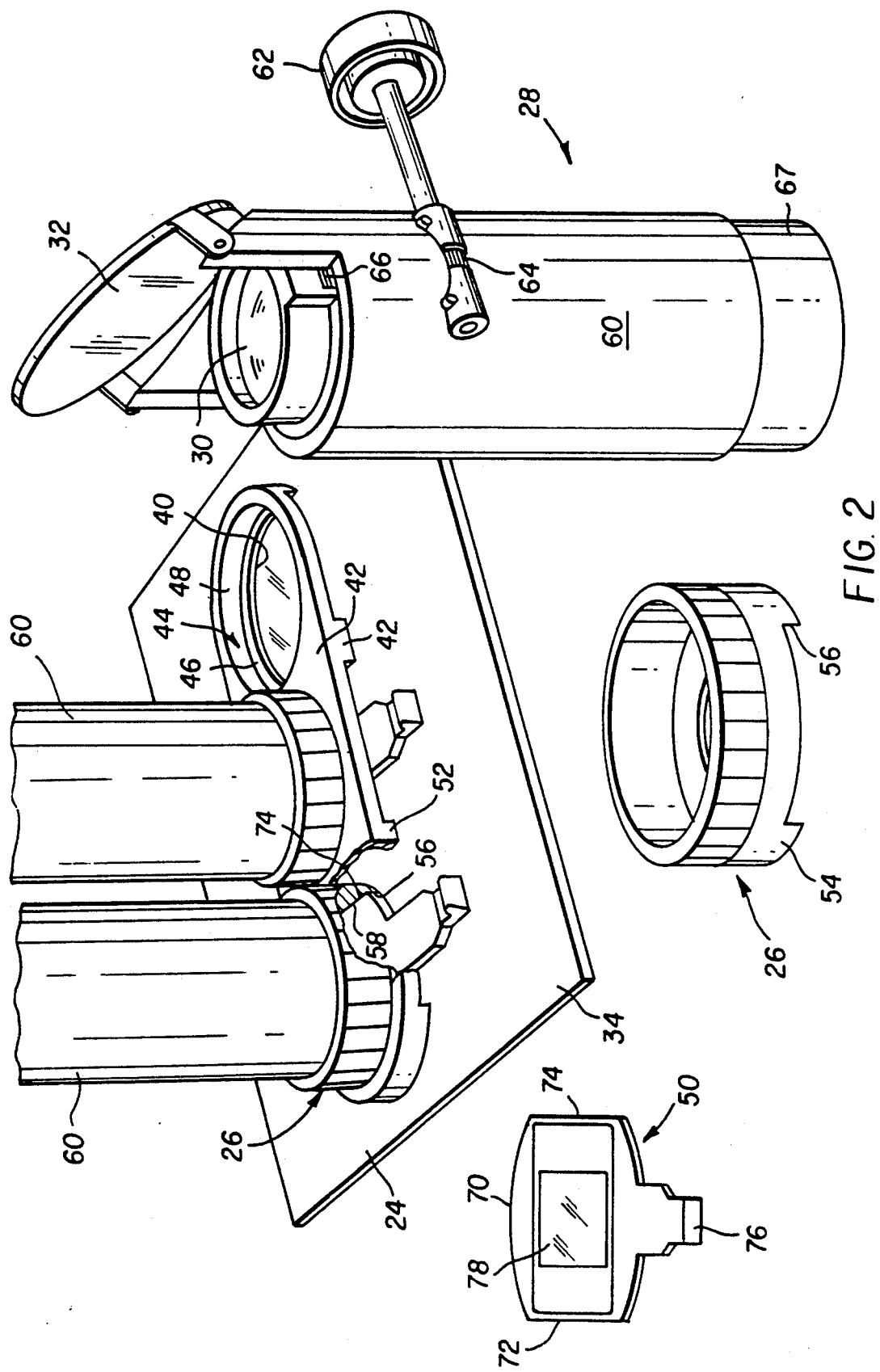
FIG. 2 is an enlarged partial view of the conversion apparatus of FIG. 1 with parts removed for clarity.

In its preferred embodiment the apparatus includes a base 24, a slide holder 26 and projection optics 28 including one or more lenses 30 (FIG. 2) and an adjustable reflecting hood or mirror 32. The slide holder and optics are actually a set of three identical structures, as shown, that may be used together or individually. For purposes of this description, however, only a single set of reference numerals will be used interchangeable on all three of these identical structures.

Base 24 includes an opaque, flat and rectangular plate 34 adapted to sit on top of and completely cover the platen 16 to intercept and block illumination from the light source that is directed toward the platen. The base defines three circular apertures 36, 38 and 40 (FIG. 5), however, that extend entirely through the opaque plate 34 and admit illumination from the light source for purposes that will become apparent from the description that follows. The apertures are arranged in a line with one in the center of the plate 34 and two offset from the center on opposed sides of the central aperture. Their diameter is approximately 50 millimeters.

The base includes a multi-function oblong stand 42 secured to the top surface of plate 34 over the three apertures 36, 38, and 40. One function of the stand is to rotatably contain slide holder 26 vertically above each aperture. For this purpose the stand includes three circular rims 44 that are slightly larger than the apertures to define a horizontal land 46 and a vertical rim 48. The land and rim align the slide holder 26 both vertically and horizontally while permitting rotation between the slide holder and the base. Another function of the base is to accommodate three slide shuttles 50 for movement between viewing positions over the apertures and loading positions horizontally removed from the apertures. The stand is supported in a raised position above the top surface of plate 34 on a plurality of legs 52. The legs are continuous around the back and ends of the stand, to block illumination from escaping into the room, but are divided across the front of the stand to accommodate the slide shuttles.

The slide holder 26 guides horizontal, reciprocating movement of the slide shuttle 50 between its viewing and loading positions and also establishes the relative positions of the slide 50 and projection optics 28 over the aperture 40. The lower portion of the slide holder 26 includes a skirt 54 configured to rest on land 46 within rim 48 in the stand 42. The skirt also is notched at 56 to receive the shuttle. Spaced guide rails 58 extend in the same direction as the intended shuttle movement and slideably engage the opposite sides of the shuttle to guide such movement. The upper portion of the slide holder includes an annular sleeve 59 for rotatably receiving the projection optics 28 and supporting the optics above the slide shuttle and aperture.

The projection optics 28 are conventional optics from a slide projector having a focal length of approximately 12 to 16 centimeters to provide sufficient magnification or enlargement at typical viewing distances. A plurality of optical elements are supported for longitudinal focusing movement inside a lens barrel 60. Rotation of a focusing knob 62, attached to the outside of the lens barrel, is translated into longitudinal focusing movement of the respective optical elements through a pinion 64 which engages a rack 66 through a slot in the barrel. The lower portion of the lens barrel 60 is reduced in diameter at 67 for receipt in the annular sleeve 59 of slide holder 26, again for rotation relative thereto. The reflecting hood or mirror 32 is pivotally coupled to the top of the lens barrel 60 for intercepting and redirecting the image horizontally for projection onto a suitable vertical viewing surface. Adjustment of the angle of the mirror and, therefor, the vertical position of the image is provided by a threaded screw and knob 68 (FIG. 3).

Slide shuttle 50 includes an arcuate section 70 for mating with the inside back wall of skirt 54, two straight edges 72 and 74 adapted for receipt between the guide rails 58, for guiding movement of the slide shuttle between its respective positions, and a tab 76 for manual engagement by an operator to move the shuttle between such positions. It a central section, the shuttle supports a photographic slide 78 for positioning over the illumination admitted by the aperture and under the projection optics.

Referring now to FIGS. 4 and 5, a fresnel lens is shown in FIG. 4 which is the same in condensing power and essentially identical in structure to the fresnel lens 18 in overhead projector 10. The fresnel lens defines a plurality of lenslets arranged in concentric circles from the center to the outer edges. On the platen 16, the center of the concentric lenslets is at the center of the platen. In accordance with the present invention fresnel disks A, B, and C are cut from the fresnel lens and rearranged in the apertures 36, 38, and 40, as shown in FIG. 5. Therefor, when the base 24 is placed over the platen 16 on the overhead projector 12, the concentric lenslets of fresnel disk B will be centrally located over the fresnel lens 16 of the overhead projector, and, like the lens 16 will define concentric circles with substantially the same center as the lens 16. Fresnel disk B then will act as a second condensing lens which will shorten by substantially half the point of convergence of the illumination above the platen. The other fresnel disks, B and C provide an additional effect. Since they now define arcuate lenslets convex toward the center of the base, or opposite the fresnel lens of the platen on the overhead projector, they redirect illumination admitted by their respective aperture toward the vertical direction above the aperture.

Operation of the present invention is believed to be apparent from the foregoing description and drawings, but a few words will be added for emphasis. The base plate 24 is positioned on the platen 16 of the overhead projector with the central aperture approximately at the center of the platen. The base plate intercepts illumination from the light source to prevent spillover into the viewing room, but admits illumination through the three apertures. The shuttle is pulled to its loading position and a slide is placed on the slide tray over the opening. The slide is then pushed into the viewing position over the aperture in the object plane of the projection optics. Alignment of the image at the viewing surface can be adjusted by rotating the support ring and the lens barrel and by tilting the mirror through adjusting knob 68. Focus similarly can be adjusted through knob 62.

Illumination from the source 14 is refocused by the fresnel disks to shorten the distance of convergence so it will correspond to the focal length of a typical slide projector lens. This provides greater magnification or enlargement of the image from the same projection distance. At the same time the fresnel disks that are offset from the center of the platen redirect the illumination admitted by the apertures to a more vertical direction above the apertures.

The invention includes three projectors in its preferred embodiment for demonstrating additive photography to students, and for this purpose may include paddle filters 82 (FIG. 7) and opaque covers 84 (FIG. 6) for changing and mixing colors independently. It should be apparent, however, that the invention includes operation as a single projector and is convenient to carry for someone wishing to use slides as a presentation medium without having to carry a separate projector.

It will be now appreciated that the invention provides an inexpensive and convenient adapter for converting an overhead projector for use with photographic slides. It uses the light source of the overhead projector but provides for increasing the magnification to present a larger image more suitable for a small object and, at the same time eliminates illumination spillover at the platen.

While the invention has been described with particular reference to a preferred embodiment, it will be understood by those skilled in the art that various changes may be made and equivalents may be substituted for elements of the preferred embodiment without departing from invention.

What is claimed is:

1. Apparatus for use with an overhead projector including a horizontal platen and a light source for directing illumination through the platen, said apparatus having a base, a slide holder and projection optics, characterized in that:
    said base includes opaque means for extending horizontally over the platen and intercepting substantially all of the illumination at the platen from the light source, said opaque means defining an aperture for admitting illumination from the light source through the aperture;
    a fresnel disk extends horizontally across the aperture for condensing illumination admitted by the aperture;
    said slide holder surrounds the aperture and includes means for positioning a slide horizontally in the illumination admitted by the aperture; and,
    said projection optics are coupled to said slide holder for projecting magnified images of slides in said holder onto a viewing surface.

2. The invention according to claim 1, wherein the projection optics include a lens defining an optical axis perpendicular to said fresnel disk and a mirror extending across the optical axis at an angle thereto.

3. The invention according to claim 1, wherein said opaque means defines a center for location over the center of the platen, the aperture is substantially circular and is offset from the center by more than the diameter of the aperture, and said fresnel disk includes a plurality of arcuate, concentric lenslets convex toward the center.

4. The invention according to claim 1, wherein said opaque means defines a center, the aperture is at the center, and two other similar apertures are disposed on opposite sides of the center, all for admitting illumination from the light source through the apertures;
    second and third fresnel disks extend one each across the other two apertures, each of said second and third disks defining a plurality of arcuate, concentric lenslets concave toward the center of the opaque means;
    second and third slide holders surround said second and third disks each including means for positioning a slide horizontally; and,
    second and third projection optics are coupled to said second and third slide holders for projecting magnified images of slides in said holders onto a vertical viewing surface.

5. An adaptor for use with an overhead projector to project photographic slides onto a viewing surface, the overhead projector including a platen and a light source for directing illumination through the platen, said adaptor comprising:
    a base including opaque means for covering the platen and intercepting substantially all of the illumination at the platen from the light source, and means defining an aperture in said covering means for admitting illumination from the light source through the aperture;
    a fresnel lens for condensing illumination admitted by said aperture;
    a slide holder on said base surrounding said aperture for positioning a photographic slide in the illumination admitted by said aperture; and,
    a projection lens coupled to said slide holder for projecting magnified images of slides in said holder onto a viewing surface.

6. Apparatus for converting an overhead projector for use with photographic slides, the projector including a platen, a light source for directing illumination along a path extending through and above the platen, and means for condensing the illumination to converge at a first distance above the platen, said apparatus comprising:
    means for shortening the convergence of the illumination to a second distance above the platen substantially half the first distance;
    means for locating a photographic slide in the illumination path approximate the platen; and,
    a projection lens having a focal length equal to said second distance for projecting onto a viewing surface magnified images of the photographic slide in said locating means.

7. Apparatus for converting an overhead projector for use with photographic slides, the projector including a platen, a light source for directing illumination along a path through and above the platen, and a first fresnel lens having a condensing power for converging the illumination at a first distance from the platen, said apparatus comprising:
    a second fresnel lens having substantially the same condensing power as the first fresnel lens for shortening the illumination convergence to a second distance from the platen;
    means for locating a photographic slide in the illumination path approximate the platen; and,
    a projection lens having a focal length equal to said second distance for projecting onto a viewing surface magnified images of the photographic slide in said locating means.

8. An adaptor for use with an overhead projector to project photographic slides onto a viewing surface, the overhead projector including a platen and a light source for directing illumination along a path through and above the platen, and a first fresnel lens having a condensing power for focusing the illumination to converge at a first distance from the platen, said adaptor comprising:
    a base including opaque means for covering the platen and intercepting substantially all of the illumination at the platen from the light source, and means defining an aperture in said covering means for admitting illumination from the light source through the aperture;

a second fresnel lens having substantially the same condensing power as the first fresnel lens for shortening convergence of the illumination to a second distance from the platen substantially half the first distance;

a slide holder on said base surrounding said aperture for positioning a photographic slide in the illumination admitted by said aperture; and, a projection lens coupled to said slide holder for projecting magnified images of slides in said holder onto a viewing surface.

9. Apparatus for converting an overhead projector for use to project slides onto a viewing surface the overhead projector including a platen and a light source for directing illumination along a path through and above the platen, said apparatus comprising:

a base including opaque means for covering the platen and intercepting substantially all of the illumination at the platen from the light source, said covering means defining a center and an aperture offset from the center for admitting illumination from the light source through the aperture;

a fresnel disk in said aperture including a plurality of arcuate, concentric lenslets convex toward the center of the covering means;

a slide holder on said base surrounding said aperture for positioning a photographic slide in the illumination admitted by said aperture; and, projection optics coupled to said slide holder and including means for projecting magnified images of slides in said holder onto a viewing surface.

10. The invention according to claim 9, wherein said projection optics define an optical axis perpendicular to said fresnel disk and include a mirror disposed at an angle to the optical axis.

11. Apparatus for use with an overhead projector including a platen and a light source for directing illumination along a path through and above the platen and having a fresnel condensing lens including a plurality of circular, concentric lenslets defining a common center, said adaptor comprising:

a base including opaque means for covering the platen and intercepting substantially all of the illumination at the platen from the light source, said covering means defining a center for location over the common center of the lenslets and three apertures disposed in a line, one aperture at the center of the covering means and the other two apertures on opposite sides of the center one, for admitting illumination from the light source through the apertures;

a fresnel disk extending across the one and each of the other two apertures including a plurality of arcuate, concentric lenslets, the lenslets extending across the one aperture being concave toward the center of the covering means and the lenslets extending across the other two apertures being convex toward the center of the covering means;

a slide holder on said base surrounding said aperture for positioning a photographic slide in the illumination admitted by said aperture; and, a projection lens coupled to said slide holder for projecting magnified images of slides in said holder onto a viewing surface.

* * * * *